United States Patent [19]
Funk et al.

[11] Patent Number: 5,937,162
[45] Date of Patent: Aug. 10, 1999

[54] METHOD AND APPARATUS FOR HIGH VOLUME E-MAIL DELIVERY

[75] Inventors: John T. Funk, Denver, Colo.; Curtis C. Generous, Alexandria, Va.; Bryan Costales, Laramie, Wyo.; Daniel Casson, Denver, Colo.

[73] Assignee: Exactis.com, Inc., Denver, Colo.

[21] Appl. No.: 08/710,964

[22] Filed: Sep. 24, 1996

Related U.S. Application Data

[63] Continuation-in-part of application No. 08/431,254, Apr. 6, 1995.

[51] Int. Cl.⁶ ........................................................ G06F 17/00
[52] U.S. Cl. .............................. 395/200.36; 395/200.47
[58] Field of Search .................... 395/200.36, 200.37, 395/200.68, 200.74, 200.49, 200.47; 379/93.01, 93.24, 100.08; 705/14

[56] References Cited

U.S. PATENT DOCUMENTS

| | | | |
|---|---|---|---|
| 5,339,156 | 8/1994 | Ishii ........................................ | 358/402 |
| 5,479,472 | 12/1995 | Campana, Jr. et al. .................. | 379/58 |
| 5,493,692 | 2/1996 | Theimer et al. . | |
| 5,504,897 | 4/1996 | Gans et al. .............................. | 395/650 |
| 5,508,817 | 4/1996 | Kunigami ................................ | 358/402 |
| 5,530,739 | 6/1996 | Okada et al. ........................... | 358/402 |
| 5,548,722 | 8/1996 | Jalalian et al. ........................ | 395/200.1 |
| 5,559,721 | 9/1996 | Ishii ........................................ | 358/402 |
| 5,680,551 | 10/1997 | Martino, II ........................ | 395/200.15 |
| 5,740,549 | 4/1998 | Reilly et al. ............................. | 705/14 |
| 5,761,662 | 6/1998 | Dasan .................................... | 395/200.36 |
| 5,793,972 | 8/1998 | Shane ...................................... | 705/14 |

OTHER PUBLICATIONS

Wancho, Network Working Group, Request for Comments: 1153, Apr. 1990.
NewsHound User Guide Internet E–Mail, Date Unknown.
Morgenstern, "Farcast Service Broadcasts Instant Info Via the Internet; Databases Use 'Droids' to Process News Items," PCWeek, Aug. 29, 1994, vol. 11, No. 34, p. 50(1).
"Business Wire Via First!" by Individual, Inc., Mar. 1, 1995.
Krol, "The Whole Internet User's Guide & Catalog," 1994, pp. 104–148.
Thomas, "Internet For Scientists & Engineers," 1995, pp. 57–70.

*Primary Examiner*—Ellis B. Ramirez
*Attorney, Agent, or Firm*—Finnegan, Henderson, Farabow, Garrett & Dunner, L.L.P.

[57] ABSTRACT

A high volume e-mail "newspaper" delivery system contains, for each customer, a personal configuration file containing the information resources that the customer would like e-mailed to his desktop. The configuration file is highly customizable, allowing the end-user detailed control over the content, format, and timing of the delivered e-mails. The e-mail messages to be sent are hashed to multiple, parallel transmission queues based on their destination MX hosts. This arrangement of transmission queues significantly increases total e-mail output because multiple queues are simultaneously processing the e-mail transmissions. A unique job number is appended to each e-mail message as it is created. The job number is used by the system to identify and track the e-mail message through the system before it is transmitted, and if the message bounces, when it returns to the system.

46 Claims, 14 Drawing Sheets

```
302 ┌ TO: JOHN DOE
    │ FROM:: CBELL@I-MAIL.COM
    └ RE: CLOSING BELL@MONTH/DAY/YEAR
---------------------------------------------------------------
304 ┌ CLOSING BELL FOR FEBRUARY 2, 1995
    └ MERRILL LYNCH, DAVID SMITH, (703) 555-1212

306 ┌ AMGN    AMGEN..........................61 7/8    -    1/8
    │ AMER    AMERICA ONLINE.................56 1/2   +2    1/2
    │ BGEN    BIOGEN.........................36 3/4    +    3/8
    │ BBTK    BROADBAND TECH.................26 1/2    -    9/16
    │ GNE     GENENTECH......................48 1/8   . . .
    │ GIC     GENERAL INSTRUMENT.............28 7/8   . . .
    │ CEL     GROUPO IUSACELL................14 7/8    -    1/8
    │ MOT     MOTOROLA ......................60 5/8    -    1/8
    │ CALL    NEXTEL.........................10       . . .
    │ ORCL    ORACLE.........................42 7/8    +    1/2
    │ PCTV    PEOPLE'S CHOICE TV.............21 1/8    +    11/16
    │ SYBS    SYBASE ........................44        +    5/8
    └ TMX     TELEFONOS DE MEXICO............33 1/2    -    3/4
---------------------------------------------------------------
308 ┌ TOTAL EQUITY VALUE           $75.328.11
    └ TOTAL CASH BALANCE           $91,392.59
===============================================================
310 ─ JOHN, PLEASE CALL ME. -DAVE S.
```

CUSTOMER DATABASE (INFORMATION ON CUSTOMER'S DESIRED SECURITIES.)

| Field | Name | Type | Description |
|---|---|---|---|
| FIELD 1-> | EMAIL | CHAR 100 | E-MAIL ADDRESS OF CUSTOMER |
| FIELD 2-> | DECIMAL | LOGICAL | DEFINE NON-INDEX SECURITY DISPLAY (FRACTION/DECIMAL) DEFAULT FALSE |
| FIELD 3-> | PRIORITY | NUM 1 | PRIORITY OF E-MAIL DISTRIBUTION |
| FIELD 4-> | CUST_REF | CHAR 25 | UNIQUE CUSTOMER NUMBER; INCLUDES CHARACTER TO INDICATE BROKERAGE FIRM |
| FIELD 5-> | CUST_ID | CHAR 10 | UNIQUE CUSTOMER NUMBER (INTERNAL TO IMAIL) |
| FIELD 6-> | CUST_NAME | CHAR 50 | CUSTOMR NAME |
| FIELD 7-> | CUST_ADD1 | CHAR 25 | CUSTOMER ADDRESS LINE 1 |
| FIELD 8-> | CUST_ADD2 | CHAR 25 | CUSTOMER ADDRESS LINE 2 |
| FIELD 9-> | CUST_CITY | CHAR 25 | CITY |
| FIELD 10-> | CUST_ST | CHAR 2 | STATE |
| FIELD 11-> | CUST_ZIP | CHAR 9 | ZIP |
| FIELD 12-> | CUST_CY | CHAR 20 | COUNTRY |
| FIELD 13-> | CUST_PHONE | NUM 10 | CUSTOMER PHONE |
| FIELD 14-> | GREETING | CHAR 35 | GREETING TO USE IN E-MAIL MESSAGE |
| FIELD 15-> | REC_OPEN | DATE | DATE RECORD CREATED |
| FIELD 16-> | REC_MOD | DATE | DATE RECORD LAST MODIFIED |
| FIELD 17-> | BROKER | CHAR 70 | BROKER NAME AND PHONE NUMBER (2ND LINE OF MESSAGE) |
| FIELD 18-> | EXPIRE | DATE | SUBSCRIPTION EXPIRATION (IF APPROPRIATE) |
| FIELD 19-> | RATE | NUM 5,2 | SUBSCRIPTION RATE (IF APPLICABLE) |
| FIELD 20-> | SUSPEND | DATE | SUSPEND DELIVERIES UNTIL THIS DATE |
| FIELD 21-> | RSA_TICK | CHAR 25 | PUBLIC ENCRYPTION KEY |
| FIELD 22-> | TRACK1 | CHAR 10 | CONTAINS SYMBOL OF SECURITY TO TRACK |
| FIELD 23-> | TRACK 2 | CHAR 10 | CONTAINS SYMBOL OF SECURITY TO TRACK |
| FIELD 24-> | TRACK 3 | CHAR 10 | CONTAINS SYMBOL OF SECURITY TO TRACK |
| FIELD 25-> | TRACK 4 | CHAR 10 | CONTAINS SYMBOL OF SECURITY TO TRACK |
| FIELD 26-> | TRACK 5 | CHAR 10 | CONTAINS SYMBOL OF SECURITY TO TRACK |
| FIELD 27-> | TRACK 6 | CHAR 10 | CONTAINS SYMBOL OF SECURITY TO TRACK |
| FIELD 28-> | TRACK 7 | CHAR 10 | CONTAINS SYMBOL OF SECURITY TO TRACK |
| FIELD 29-> | TRACK 8 | CHAR 10 | CONTAINS SYMBOL OF SECURITY TO TRACK |
| FIELD 30-> | TRACK 9 | CHAR 10 | CONTAINS SYMBOL OF SECURITY TO TRACK |
| FIELD 31-> | TRACK 10 | CHAR 10 | CONTAINS SYMBOL OF SECURITY TO TRACK |
| FIELD 32-> | TRACK 11 | CHAR 10 | CONTAINS SYMBOL OF SECURITY TO TRACK |
| FIELD 33-> | TRACK 12 | CHAR 10 | CONTAINS SYMBOL OF SECURITY TO TRACK |
| FIELD 34-> | TRACK 13 | CHAR 10 | CONTAINS SYMBOL OF SECURITY TO TRACK |
| FIELD 35-> | TRACK 14 | CHAR 10 | CONTAINS SYMBOL OF SECURITY TO TRACK |
| FIELD 36-> | TRACK 15 | CHAR 10 | CONTAINS SYMBOL OF SECURITY TO TRACK |
| FIELD 37-> | REC_MOD | DATE | DATE RECORD LAST MODIFIED |

SOURCE INFORMATION DATABASE (INFORMATION ON STOCKS, BONDS,
    MUTUAL FUNDS, INDEXES,[OPTIONS, CURRENCIES])

| FIELD 1-> | EXCHANGE | CHAR 1 | EXCHANGE WHERE SECURITY TRADED |
| FIELD 2-> | SYMBOL | CHAR 10 | TICKER OR REFERENCE SYMBOL FOR SECURITY |
| FIELD 3-> | CLOSE | NUM 10,4 | CLOSING PRICE FOR SYMBOL |
| FIELD 4-> | CHANGE | NUM 8,4 | CHANGE IN PRICE FOR SYMBOL FROM PRIOR TRADING DAY |
| FIELD 5-> | VOLUME | NUM 7 | VOLUME OF SHARES TRADED FOR SYMBOL |
| FIELD 6-> | HIGH | NUM 10,4 | HIGH PRICE FOR SYMBOL DURING DAY |
| FIELD 7-> | LOW | NUM 10,4 | LOW PRICE FOR SYMBOL DURING DAY |
| FIELD 8-> | OPEN | NUM 10,4 | OPENING PRICE FOR SYMBOL DURING DAY |
| FIELD 9-> | HIGH52 | NUM 10,4 | 52 WEEK HIGH FOR SECURITY |
| FIELD 10-> | LOW52 | NUM 10,4 | 52 WEEK LOW FOR SECURITY |
| FIELD 11-> | SPLIT | LOGICAL | RECENT SHARE SPLIT |

206

NAMES AND SYMBOLS DATABASE (REFERENCE DB ON SYMBOLS & SECURITY NAMES)

FIELD 1-> SYMBOL      CHAR 10  TICKER OR REFERENCE SYMBOL FOR SECURITY
FIELD 2-> SEC_NAME    CHAR 25  SECURITY NAME OF SYMBOL

FIG. 4B

METHOD AND APPARATUS FOR HIGH VOLUME E-MAIL DELIVERY

RELATIONSHIP TO COPENDING APPLICATIONS

This application is a continuation-in-part application of copending U.S. application Ser. No. 08/431,254, filed Apr. 6, 1995, the content of which is hereby incorporated by reference.

BACKGROUND OF THE INVENTION

1. Field of the Invention

The present invention relates to electronic mail, and more particularly, to high volume electronic mail delivery systems and methods.

2. Description of the Related Art

Electronic mail ("e-mail") is to the 1990s what fax machines were to the 1980s—a must-have capability for any corporate employee or service professional. Additionally, consumers are increasingly adopting e-mail through on-line services. The Internet, for example, has linked disparate e-mail systems, creating a truly international distribution medium. It is estimated that over thirty million people have access to e-mail via the Internet today with an annual growth rate exceeding 100 percent.

Today, e-mail is used primarily as an interpersonal communication technology. Corporate users communicate with customers, vendors, peers, subordinates, and superiors, while residential users are increasingly using e-mail to stay in touch with friends and relatives.

End-users generally do not use e-mail as an information services tool, however. As noted above, most e-mail is generated by one person and sent to another person. Very little of the worldwide e-mail volume is created by a computer. This is due in no small part to the challenges of creating automated processes for the generation and distribution of large volumes of unique e-mail messages.

In the past five years, several services have been created with the goal of using e-mail as an information services tool by creating a type of personalized electronic newspaper. The services use computers (and proprietary software) to sift through news stories or press releases and select those articles/stories that match a predefined profile of a particular subscriber. Generally, the profile is based on particular industries or products; however, there may be options for somewhat more refined sifting criteria.

These services all have one thing in common—they manipulate publicly available information (AP wire service, Reuters, Business Wire, etc.) and match this information to a generic customer profile, not to a unique individual. The resulting personalized newspaper is sent via e-mail or facsimile to all subscribers that match the selected profile.

There are other companies that have started on-line services that allow end-users access to more personalized information, such as Compuserv, Prodigy, America-on-line, or World Wide Web home pages. These services allow end-users to get quotes on publicly traded securities and allow end-users to search databases for particular strings of text or subject matter. These services suffer from a common disadvantage, however, namely, they require the active involvement of the end-user in accessing the information. In other words, each time the end-user desires information, he must dial up the service provider and request the information.

The Internet is made up of thousands of computers loosely coupled to one another by a common protocol and fiber optic transmission backbones. Each e-mail sent over the Internet must contain an address specifying to whom the e-mail is to be delivered.

An Internet e-mail address, such as, for example, "jfunk@merc.com," includes the name of the user the e-mail is addressed to (i.e., "jfunk"), followed by an "@" symbol. The mnemonic after the "@" defines the local destination the e-mail is destined for. The destination may be a domain name such as "merc.com," which does not refer to a specific computer, but to a networked domain of computers. Alternatively, the destination may correspond to a specific computer, such as the destination "netra.merc.com," which references the computer named "netra" in the "merc.com" domain.

When the destination after the "@" symbol refers to a group of hosts under the same administrator, such as "merc.com," it is called a domain name. When the destination refers to a specific computer, such as "netra.merc.com," the destination is often referred to as the host, or hostname. Throughout this specification, "hostname" and "domain name" are used to refer to the symbolic destination of the to-be-delivered e-mail.

Hostnames exist for the convenience of humans. The actual routing of information on the Internet is done with Internet Protocol ("IP") addresses. An IP address is a 32 bit, non-symbolic number, which represents the unique address of a device connected to the Internet. Before a computer can deliver e-mail, it must first determine the correct recipient IP address. Mappings between hostnames and IP addresses are kept in a distributed database on the Internet called the Domain Name System (DNS). Before the computer transmits its e-mail, it queries the DNS with a host name and waits for the corresponding IP address to be returned.

Most hostnames correspond to at least one IP address. The hostname "www.merc.com," for example, corresponds to the IP Address 204.255.152.133. The domain name "merc.com" is not a physical entity. It, therefore, has no IP Address and information cannot be directly routed to it. E-mail delivered to "merc.com" is sent to a site designated to receive e-mail for "merc.com." Alternate designated sites may be desirable even when the normal receiving site has an IP address. For example, an e-mail recipient may not want e-mails sent to his address at night if the computer is turned off.

The alternate designated sites for a hostname or domain name are called the hostname's Mail eXchanger (MX) hosts. A query of the DNS for the MX information on "jfunk@merc.com" will return a list of Internet hosts that will accept mail for "merc.com." If no alternate hosts are available, the query will indicate as much.

To transmit an e-mail message, a number of processing steps must be performed before the e-mail message is actually transmitted onto the Internet. Initially, a sending program determines whether it knows the current IP address corresponding to the e-mail hostname or MX hostnames. If not, the sending program queries the DNS for the IP address. The sending program then transmits an initial message to the destination, asking whether the destination computer can receive the e-mail. If the destination computer replies favorably, the sending program breaks the e-mail message up into a series of information packets, and separately transmits each packet. The destination computer receives the packets and reassembles them into the complete e-mail message.

Traditionally, e-mail transmission has been handled by a single sending program operating on a single queue of messages. That is, e-mails to be transmitted are lined up in a first-in-first-out (FIFO) queue, and the queue is handled by a transmitting program. Although this method works well for low-volume e-mail transmission, for sites that transmit thousands, or even hundreds of thousands of e-mail messages a day, the above-described method is slow and significantly underutilizes network bandwidth because information is being sent over the Internet neither while the DNS is being queried nor while the transmitting program is waiting for the destination to acknowledge the initialization message.

Occasionally, a host site cannot complete delivery of an e-mail message. When this occurs, the host site typically returns ("bounces") the e-mail message back to the sender with an attached error message explaining why the message could not be delivered. The returned messages are called "bounced messages." A large number of received bounced messages is burdensome on the system operator, who must manually read through the messages to determine the appropriate action.

It is therefore desirable to provide an information delivery system and methods that substantially obviate one or more of the problems due to the limitations and disadvantages of the related art.

It is also an object of the present invention to provide a low-cost system that allows a user to passively receive unique, customized, personal information via e-mail and/or facsimile machine.

It is another object of the present invention to provide an e-mail processing system that allows a user to automatically edit user information by either sending an e-mail or interacting with the processing system via the World Wide Web (WWW).

It is still a further object of the present invention to provide an efficient, high volume e-mail transmission system and method.

It is still a further object of the present invention to provide an e-mail system and method to effectively, automatically handle bounced e-mail messages.

Additional features and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof as well as the appended drawings.

SUMMARY OF THE INVENTION

The advantages and purposes of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purposes of the invention, as embodied and broadly described herein, in one embodiment, the invention is a system and method for controlling e-mail delivery to a plurality of destination hosts. Exemplarily, one method comprises the steps of routing outgoing e-mail messages to one of a plurality of e-mail queues, the routing being controlled such that e-mail messages with common destinations are routed to the same e-mail queues; and delivering the e-mail messages in each queue to a destination host designated by the e-mail messages.

In another embodiment, the invention is a method of tracking e-mail messages. This embodiment comprises the steps of: inserting a code into a first e-mail message; sending the first e-mail message with the inserted code over a network to a recipient; receiving a modified version of the first e-mail message, the modified version of the first e-mail message containing the code; and matching the received e-mail message with the first e-mail message based on the code.

In yet another embodiment, the invention is a method for forming an electronic mailing for delivery to subscribers on a network. In this embodiment, the method comprises the step of entering a record into a database for each of the subscribers. This step further includes the substeps of: selecting timing information indicating when the electronic mailing is to be assembled and delivered, selecting content information of the electronic mailing, and selecting formatting information of the electronic mailing. The method also includes the steps of: assembling the electronic mailing for each subscriber based on the record corresponding to the subscriber and transmitting the assembled electronic mailing to the subscriber.

The invention also includes corresponding systems for performing these processes and methods as disclosed and claimed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate several preferred embodiments of the invention and, together with the description of the preferred implementations, serve to explain the principles of the invention.

In the drawings:

FIG. 3 is a preferred embodiment of an e-mail message format generated by the service processing system in accordance with one embodiment of the present invention;

FIG. 4 illustrates sample database structures in accordance with one embodiment of the present invention;

BEST MODE FOR CARRYING OUT THE INVENTION

Reference will now be made in detail to the construction and operation of preferred implementations of the present invention which are illustrated in the accompanying drawings. In those drawings, like elements and operations are designated with the same reference numbers where possible.

The following description of the preferred implementations of the present invention is only exemplary of the invention. The present invention is not limited to these implementations, but may be realized by other implementations.

Figure 1:
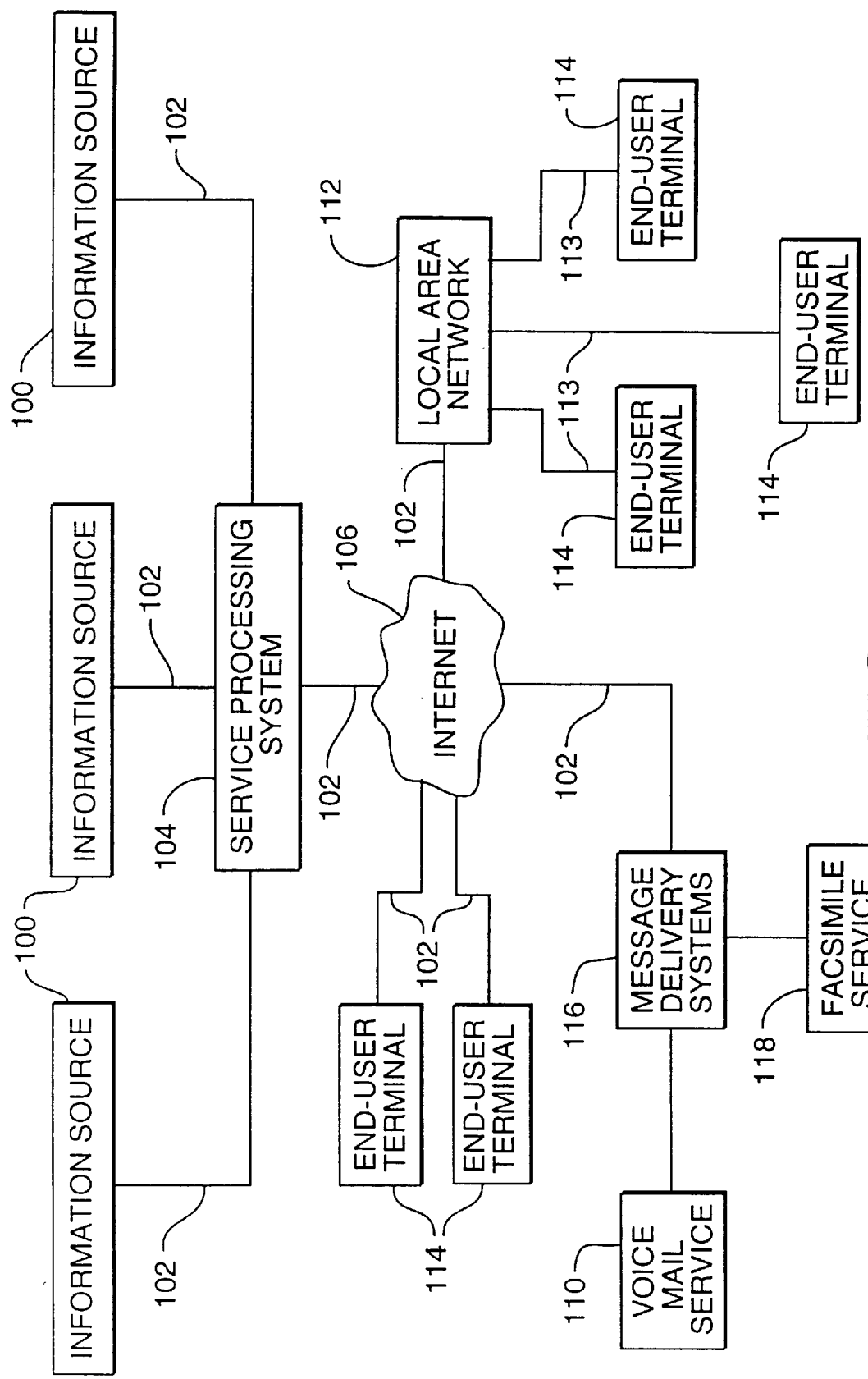
FIG. 1 is a block diagram of an information services system in accordance with one embodiment of the present invention.

FIG. 1 is a block diagram of an information services system in accordance with one embodiment of the present invention. In a preferred embodiment, the information provided by the system is securities information, such as stocks, bonds, mutual funds, etc. However, the invention contemplates information of all kinds, including, e.g. account balances, charges and payments, cleared checks, weather update information, sports information, etc.

As shown in FIG. 1, one or more information sources 100 are connected to a service processing system 104 by connections 102. Connections 102 preferably include standard telephone line connections, but may include other conventional computer connections. Information sources 100 include any source of information such as the Associated Press, Reuters News, or The Wall Street Journal. Consistent with the preferred embodiment, one of the information sources 100 would obtain financial information from, e.g., a stock exchange.

Service processing system 104 connects via a connection 102 to the Internet 106 or some other e-mail network. End-user terminals 114 also connect to the Internet 106 via connections 102, and the service processing system 104 provides the information to the end-user terminals 114 through the Internet 106.

As discussed in more detail below, generally, service processing system 104 receives information from information sources 100, translates that information into database format, and stores the translated information in databases corresponding to services provided by the service processing system 104. Service processing system 104 then generates e-mail messages based on the contents of the databases and feeds those e-mail messages through the Internet 106 to enduser terminals 114.

As also shown in FIG. 1, e-mail messages can also be routed to end-user terminals 114 via a local area network ("LAN") 112. The LAN 112 is connected to the Internet 106 by a connection 102, and end-user terminals 114 are connected to the LAN via conventional LAN connections 113.

Alternatively, e-mail messages can be delivered to an end-user by voice-mail or facsimile message delivery systems. As shown in FIG. 1, a message delivery system 116 is connected to the Internet 106 via a connection 102. The message delivery system 116 may provide for voice-mail services 110 and/or facsimile services 118, in accordance with conventional techniques. As discussed in more detail below, if the service processing system 104 provides e-mail messages to a message delivery system 116, the service processing system 104 can first translate the e-mail messages into the appropriate voice-mail or facsimile format for delivery to the message delivery system 116. This translation is provided by text-to-voice processor 220 or facsimile processor 216, respectively. Alternatively, e-mail messages may be delivered to the message delivery system 116 as a conventional e-mail message, and the message delivery system 116 can translate the e-mail message into the appropriate voice-mail or facsimile message format.

Figure 2:
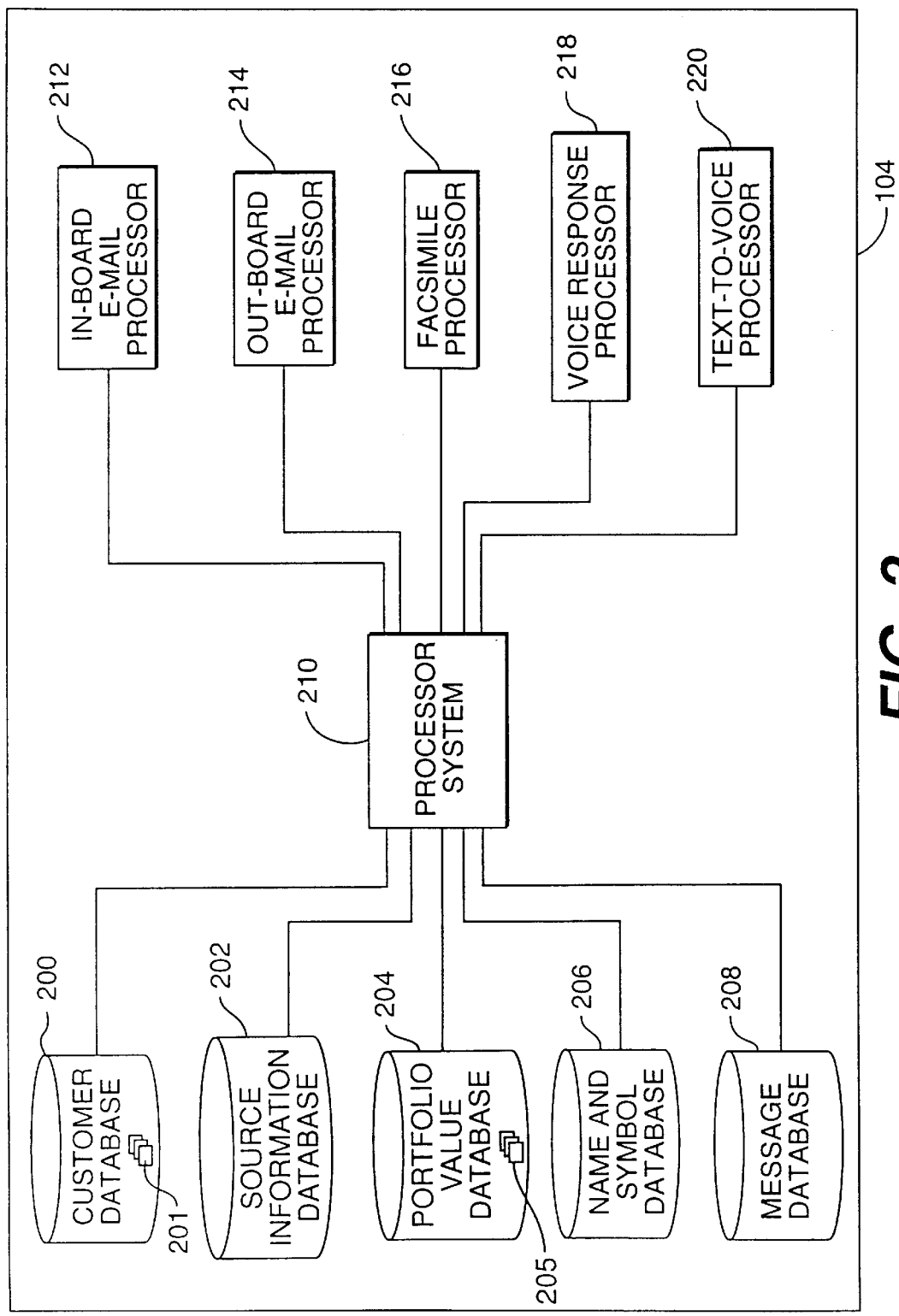
FIG. 2 is a block diagram of a service processing system in accordance with one embodiment of the present invention.

FIG. 2 is a block diagram of a service processing system 104 in accordance with one embodiment of the present invention. As shown, service processing system 104 preferably includes a plurality of databases, including a customer database 200, source information database 202, portfolio value database 204, name and symbol database 206, and message database 208. The contents of each database 200–208 is described in more detail below.

In addition, service processing system 104 includes an inbound e-mail processor 212, outbound e-mail processor 214, facsimile processor 216, voice response processor 218, and text-to-voice processor 220. The purposes and functions of each processor 212–220 will also be described in more detail below.

Each database 200–208 and each processor 212–220 is connected to a processor system 210. Generally, processor system 210 receives information from information sources 100 and stores that information in one of databases 200–208. As described in more detail below, at predetermined intervals, such as one per day, processing system 210 generates a temporary list or file of all information to be delivered via e-mails to end-users, then sends the file to either the outbound e-mail processor 214, facsimile processor 216, or text-to-voice processor 220, depending on the delivery path. These processors 214, 216, and 220, translate the file into e-mail format or message delivery format for the Internet 106, depending on whether the e-mails will be delivered via e-mail message delivery system 116.

Before describing the system operation for generating and transmitting e-mail messages, it is useful to consider an exemplary e-mail message format as displayed on an end-user terminal 114.

FIG. 3 shows an exemplary e-mail message 300 to be sent to end-user, John Doe. The exemplary e-mail message 300 includes a first information field 302 to identify the user, the source of the e-mail, the name of the e-mail service, and the date. The e-mail message 300 also includes a message field 304, which can include a text message as selected by the service provider. In the preferred embodiment where the invention provides stock quote information, field 306 lists selected companies (both exchange acronym and formal name), their stocks' present values, and the amount of gain or loss since a previous information period.

The preferred e-mail message 300 may also include information field 308 for providing customer portfolio balance information including total equity value and total cash balance for a customer's portfolio. Finally, an additional generic message field 310 may be included at the end of the message. As discussed in more detail below, messages for this field 310 can come from several sources, including third parties.

In accordance with the present invention, information for the various fields of 302–310 of the e-mail message 300 come from databases 200–208. Before describing the system processing operations for generating an e-mail message from the database information, the content of certain databases used to generate the exemplary e-mail 300 will be described.

FIG. 4 shows the database information for the customer database 200, source information database 202, and the name and symbol database 206. Specifically, in this preferred embodiment, customer database 200, for each customer subscribing to the service, includes a customer record 201 (FIG. 2), which lists thirty-seven fields relating to the service processor, the customer, and service. Column 4 of the listings in FIG. 4 provides a brief description of each field; hence, these descriptions need not be repeated here. With reference to fields 22–36, however, customer database 200 preferably provides for a list of fifteen securities, each field containing one security.

The names and symbols for the securities (see field 306 of FIG. 3) come from the names and symbols database 206 which, as shown in FIG. 4, includes the company's exchange symbol (field 1) and the formal name of the company associated with the symbol (field 2).

Customer database information for a customer record 201 is generated each time a new customer subscribes to an information service. The information to complete the fields may be gathered by an operator, over a direct connection 102 or, in response to a request from a potential customer, service processing system 104 may send a customer field template to the potential customer, who can complete certain field information and mail the information in via conventional mail or e-mail.

Referring still to FIG. 4, source information database 202 includes fields 1–11. These fields are dynamically updated at a predetermined interval (e.g. once per day) or in real-time by an information source 100. In the preferred stock quote embodiment, the information source 100 provides stock information at the close of a stock exchange business day. Column 4 of FIG. 4 provides a brief description of each field 1–11 in the source information database 202; hence, these descriptions need not be repeated here.

Figure 5:
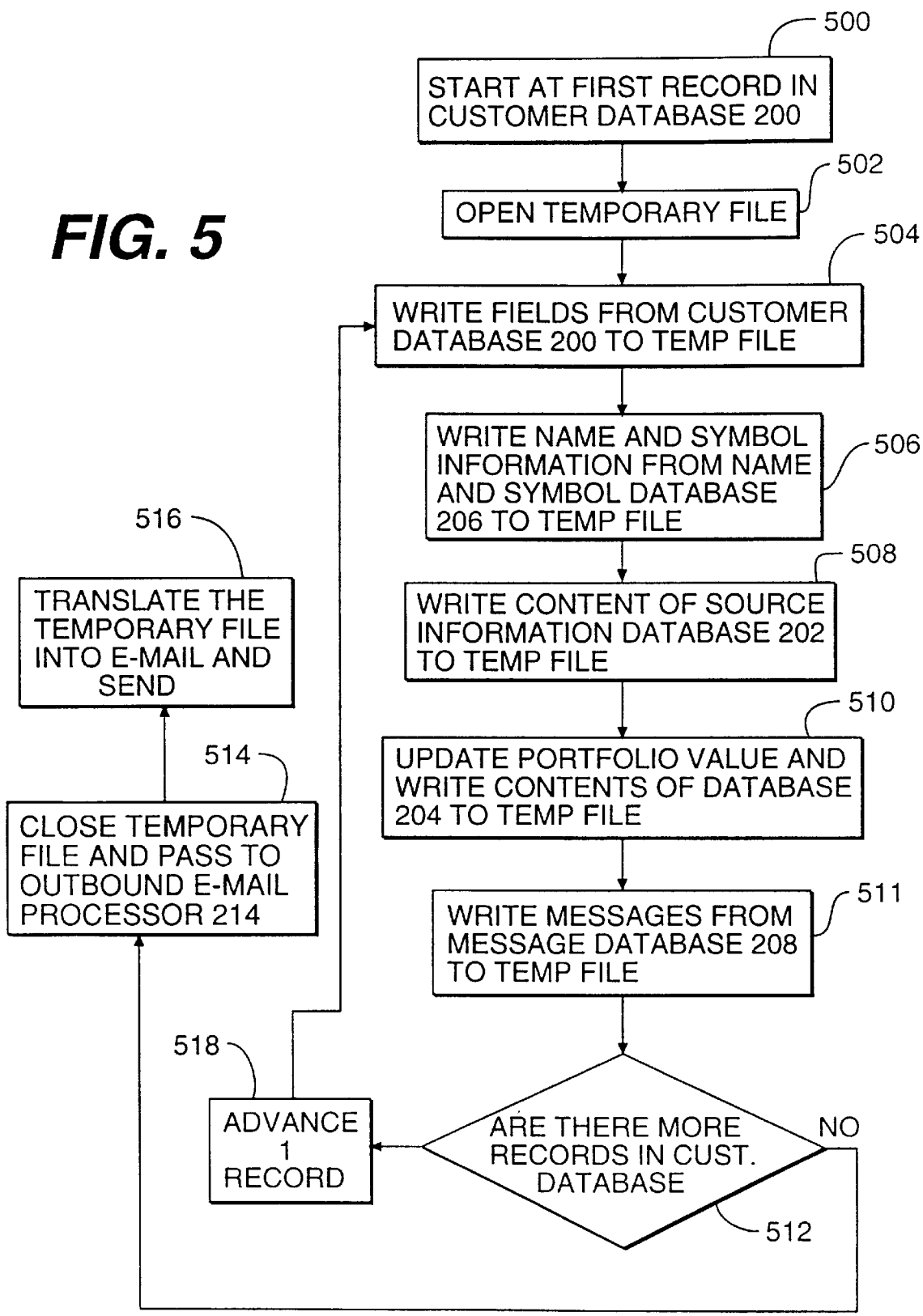
FIG. 5 is a processing flow diagram illustrating the processing operations of the service processing system to set up and automatically generate an e-mail message in accordance with one embodiment of the present invention.

FIG. 5 discloses the processing flow of the service processing system 104 for creating and distributing information e-mail for the preferred stock quote embodiment. The processing starts with the first customer record 201 in the customer database 200 (step 500). Initially, processor system 210 opens a temporary list or file (step 502). The temporary file will be filled in by the processor system 210 with the information from the various databases 200–208, depending on the service. For example, in the preferred embodiment stock quote service, the processor system 210 provides the contents of fields 1–37 of the customer record from the customer database 200 to the temporary file (step 504). Information from some of those fields will be used to complete fields 302 and 304 of the corresponding e-mail message 300 and to set up the information field 306 of the corresponding e-mail message 300.

Based on the company symbols in fields 22–36 of customer database 200, process system 210 goes to the name and symbol database 206 and writes to the temporary file the company name and symbol for the customer's selected securities (step 506). This information provides the name and symbol information for field 306 of the e-mail message 300. Process system 210 then writes the content of the source information database 202 to the temporary file for each security listed in the temporary file (step 508). This source information provides the stock values and changes as listed in field 306 of the e-mail message 300.

Next, process system 210 goes to the portfolio value database and inspects the portfolio value for a customer off a customer portfolio record 205. Preferably, using the information stored in the customer's portfolio record 205, the processor system 210 calculates new portfolio values based on the source information and updates the customer portfolio record 205. Alternatively, the customer portfolio records 205 can be updated by an information source 100 or other third party. Process system 210 then takes the portfolio values from the portfolio value database 204 and adds that information to the temporary file (step 510). This portfolio information provides the information for field 308 of the e-mail message 300.

Finally, processor system 210 looks to the message database 208 for any messages for the customer and writes these messages to the temporary file (step 511 ). These messages are used to fill message field 310 of the e-mail message 300.

In accordance with the present invention, a party can connect to the processor system 210 and leave a message for a customer. The message may be received as an e-mail, facsimile, or voice message, then processed into electronic storage form by one of inbound e-mail processor 212, facsimile processor 216, or voice response processor 218, in accordance with conventional techniques. The message is then stored in message database 208. For example, message database 208 may be edited by a broker who desires to send the message: "John, please call me.-Dave S." If the broker sends an e-mail to the inbound processor 212, with the appropriate key words, processor system 210 adds that message to the message database 208 for the customer. The key words may include words such as "message," which the processor system 210 recognizes and processes accordingly. The inbound message also includes a customer selector field to identify a customer or class of customers.

After completing the temporary file for a customer, processor system 210 determines whether there are more customer records 201 in the customer database 200 (step 512). If not, processor system 210 closes the temporary file and passes it to the outbound e-mail processor 214 (step 514). If, however, other customer records remain in the customer database 208, the system advances to the next record (step 518), and begins to process that customer record at step 504. Alternatively, processor system 210 may close each temporary file and pass it to the outbound e-mail processor 214 after completing the file for each customer.

The outbound e-mail processor 214 translates the temporary file into individual e-mail messages for each subscriber and sends the e-mail messages to an end-user terminal 114 through Internet 106 (step 516). The translation of the e-mail messages from the temporary file are performed in accordance with Internet transfer protocols.

In accordance with the present invention, a customer can also modify his/her services by modifying his/her customer record 201. As with input messages discussed above, a customer can modify a customer record via e-mail, facsimile, or voice-mail using the corresponding processors 212, 216, or 218.

Figure 6:
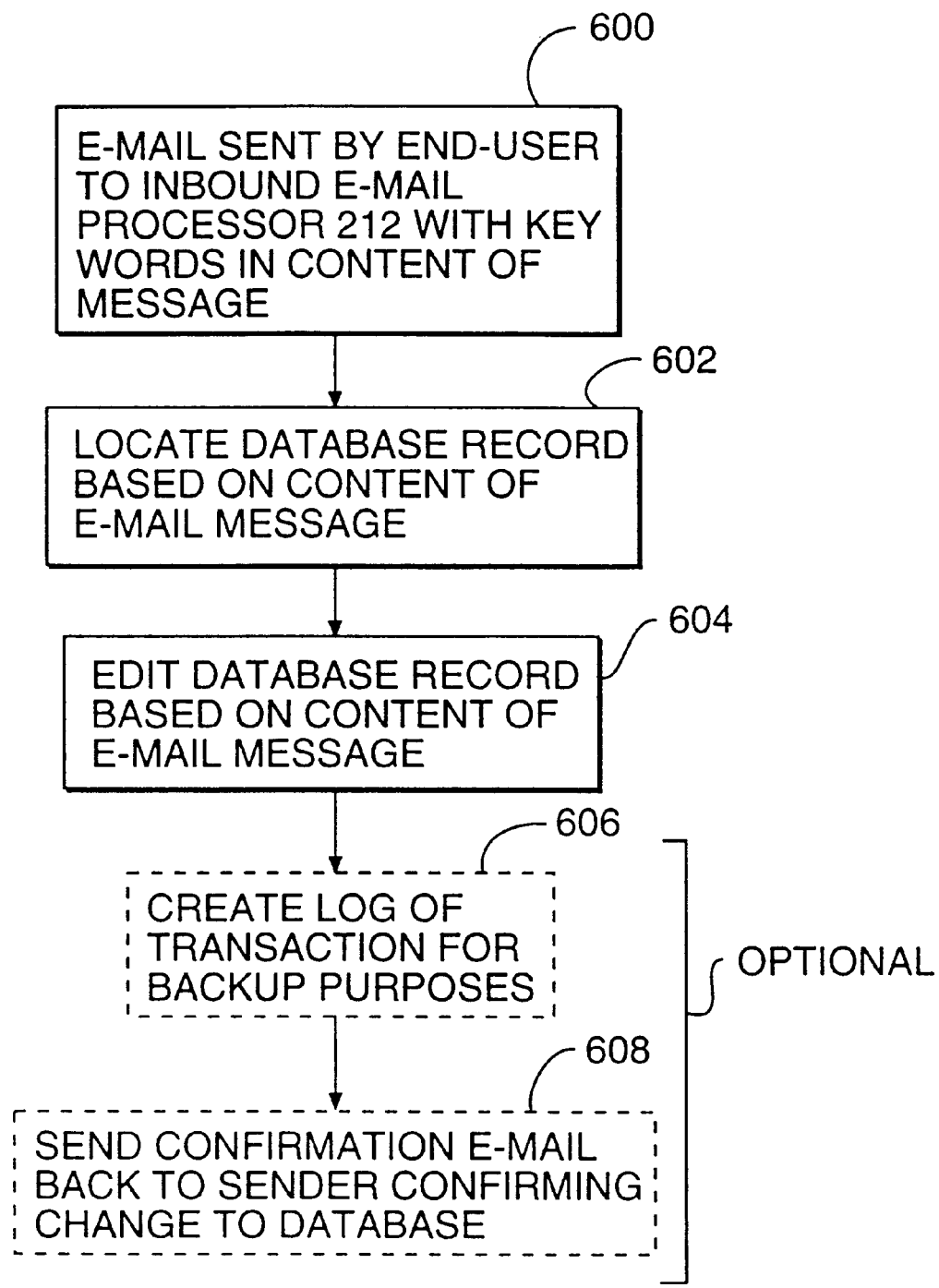
FIG. 6 is a processing flow diagram operation of the service processing system to modify a database based on inbound information in accordance with one embodiment of the present invention.

FIG. 6 illustrates a processing flow diagram for providing this modification via an e-mail message. Initially, an e-mail message is received by the inbound e-mail processor 212, translated, and passed to processor system 210 (step 600). Based on key words in the content of the message, processor system 210 learns that it should modify one or more customer records and locates the customer's database record(s) 201 (step 602). For example, the inbound e-mail message may include a field that says "edit" or "modify," which processor system 210 recognizes as an instruction to edit or modify one or more customer records. Processor system 210 then looks to another field of the e-mail message that identifies one or more customer's name(s) or number(s). After locating the customer record(s), processor system 210 then edits the database record based on the content of the e-mail message (step 604). Processor system 210 can, optionally, create a log of the transaction for backup purposes (step 606), then generate an e-mail to send back to the customer concerning the edits to the database (step 608).

In accordance with the present invention, processor system 210 comprises a personal computer or a larger workstation. Databases 200–208 preferably comprise relational database software, e.g. Oracle or Sybase. Also, processors 212–220 may comprise a separate computer from processor system 210 or may be the same computer as processor system 210.

Figure 7:
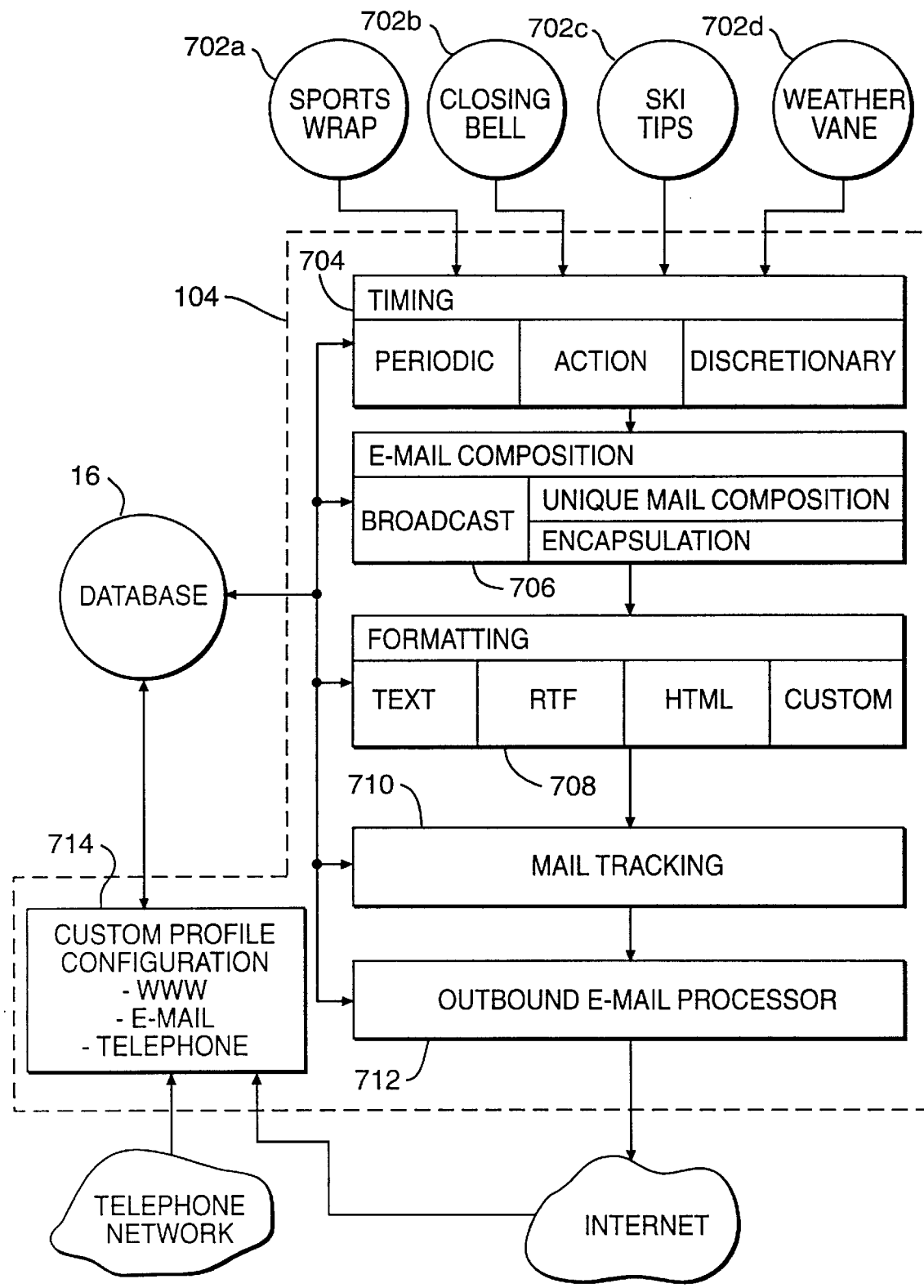
FIG. 7 is a block diagram showing an alternative service processing system in accordance with another embodiment of the present invention.

FIG. 7 is a block diagram showing an alternative embodiment of a service processing system 104 in accordance with another embodiment of the present invention. According to this embodiment, for each customer of the system, a personal configuration file is created containing the information resources that the end-user would like e-mailed to his desktop. The configuration file is highly customizable, allowing the customer detailed control over the content, format, and timing of the delivered e-mails.

As discussed in greater detail below, in this embodiment, the e-mail messages to be sent are preferably hashed to multiple, parallel transmission queues based on their destination MX hosts. This novel arrangement of transmission queues significantly increases total e-mail output because multiple queues are simultaneously processing the e-mail transmissions.

In this embodiment, a unique job number may also be appended to each e-mail message as it is created. The job number is used by the system to identify and track the e-mail message through the system before it is transmitted, and if the message bounces, when it returns to the system.

As shown in FIG. 7, service processing system 104 preferably has access to a plurality of source information databases 702a–d, each similar to database 202. Preferably, source information databases 702a–d contain information on a variety of topics, such as, sports 702a, financial 702b, hobbies (such as skiing) 702(c), or weather 720(d); however, the present invention contemplates any type of information. Information is retrieved from the databases 702 by timing processor 704 and forwarded to e-mail composition processor 706. From there, it is processed by formatter 708 and then sent to e-mail tracker 710. Finally, the information is transmitted to out-bound e-mail processor 712, where it is delivered.

In this embodiment, a database 16 preferably stores information relating to customer account information and system delivery information. Alternatively, database 16 could be implemented as multiple databases, such as databases 200, 204, 206, and 208 shown in the embodiment of FIG. 2.

Database 16 stores, for each customer, a personal configuration file including fields describing each customer's desired electronic message configuration and provides such information to the timing processor 704, e-mail composition processor 706, and formatter 708.

Through customer profile configuration processor 714, each customer may individually modify his account configuration via e-mail or conventional telephone systems, as was previously described with reference to the embodiment of FIG. 2. Alternatively, a customer may modify his account via the World-Wide-Web ("WWW"). If the WWW is used as an interface to profile configuration processor 714, the customer may view the status of his account, including seeing which e-mail messages have been sent. The customer profile configuration processor 714 modifies the corresponding customer fields in database 16 to reflect the updated customer account information.

In operation, timing processor 704 determines, based on each customer's account information, when to initiate preparation of an e-mail message for delivery. The timing section provides flexible, highly configurable customer control over when and what should be delivered to the customer. For example, the customer's account information may indicate that information from certain databases should be delivered periodically (e.g., send a weather report every six hours). Alternatively, the account information may indicate that information should be delivered based on an external action (e.g. when the customer sends a requesting e-mail to the system or when a certain stock drops below a preset threshold). Finally, the timing processor may determine that information is to be mailed to customers based on discretionary actions of a system administrator.

The timing processor 704 works in conjunction with the e-mail composition processor 706 to assemble the customer's electronic message. E-mail delivery initiated in the timing processor 704 is assembled in its final substantive form by the composition processor 706. Based on information from the timing processor 704 and customer account information from the database 16, the composition processor 706 determines: who shall receive the delivery, e.g., a unique individual broadcast or a group of end-users; what pieces of information are to be assembled for each individual end-user; and, when there are multiple pieces of information for delivery, whether the customer would like the information delivered as a series of e-mail messages or as one encapsulated e-mail message.

The composition processor 706 may insert general or targeted advertisements into the electronic message. In the case of targeted advertisements, the composition processor may decide add or delete advertisements based on the customer account information or on information already assembled into the message.

After the e-mail messages are prepared for content by the timing processor 704 and the e-mail composition processor 706, the e-mail messages are formatted into their final delivery form by the formatter 708. The formatter 708 formats the e-mails to a customer chosen format indicated in the customer configuration file. There are many potential ways to format an e-mail message, the customer's choice will generally depend on the hardware and software the customer is using to view the delivered mail. Exemplary formats include: standard text only; rich text format (RTF); Hyper-Text Markup Language (HTML); or a system customized format. Preferably, the system defaults to a text only format because this format is viewable by all e-mail readers, although HTML formatting is particularly desirable, if available, because it permits graphic-based viewing.

For each piece of e-mail to be delivered, e-mail tracking section 710 creates a record in the database 16, identifying the e-mail. Further, e-mail tracking section 710 appends a unique job number to each piece of e-mail to identify the e-mail with its corresponding record. Given a job number, a lost or garbled message can be reassembled and delivered. As the e-mail progresses through service processing system 104, its record is updated.

Finally, the e-mail messages are sent to the out-bound e-mail processing section 712, where they are transmitted to the customers. The out-bound e-mail processing section 712 is described in further detail below with reference to FIG. 9.

Figure 8:
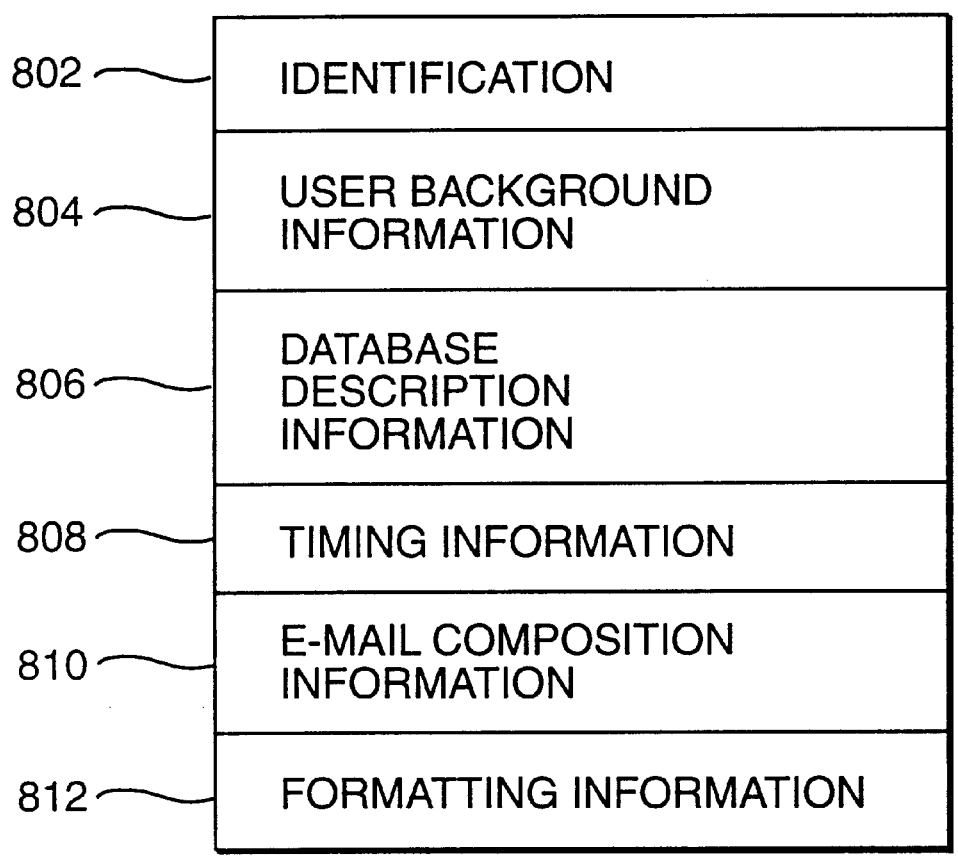
FIG. 8 is a block diagram illustrating an exemplary composition of an end-user configuration file for a service processing system in accordance with another embodiment of the present invention.

FIG. 8 is a block diagram illustrating an exemplary composition of a customer configuration file according to the alternative embodiment of service processing system 104. Section 802 contains customer identification information, similar to fields 1–14 shown in FIG. 4. Optional field 804 contains background information about the customer such as, for example, age, annual income, and hobbies. Preferably, the background information is used to intelligently target product advertisements to the customer. Field 806 contains information describing the information services the customer has subscribed to. Fields 808, 810, and 812 contain information relating to the timing information, the e-mail composition information, and the formatting information, respectively, used by the timing section 704, e-mail composition section 706, and the formatting section 708, respectively.

The customer configuration file 800, stored in database 16, forms the basis for the individually customizable e-mail message configuration. Customer's may conveniently view or modify their configuration file through profile configuration processor 714. The customer configuration file may be organized in many alternative formats, and still effectively store the end-user's specific information choices.

Figure 9:
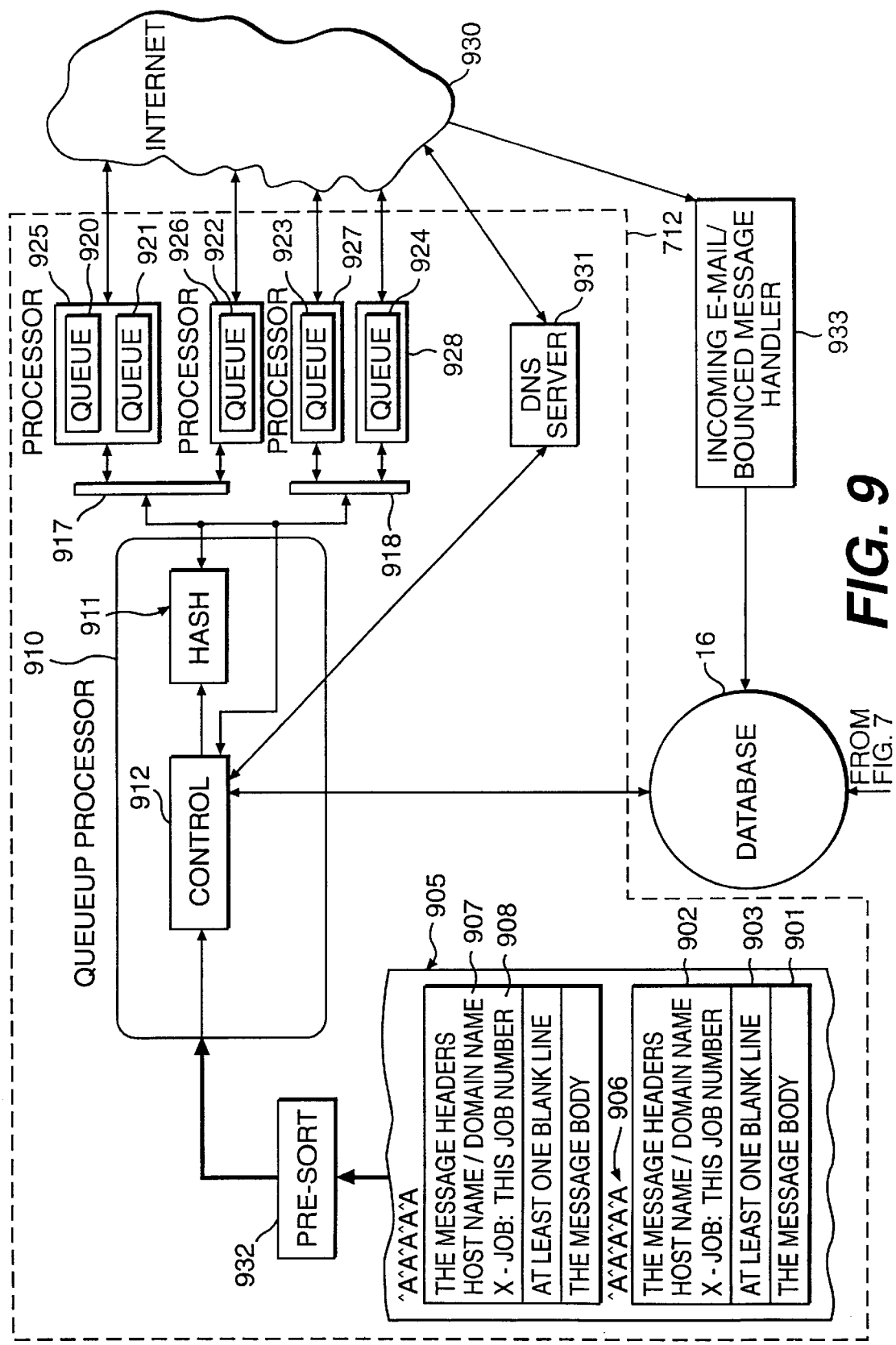
FIG. 9 is a block diagram showing a detailed view of an outbound e-mail processing section for a service processing system in accordance with another embodiment of the present invention.

FIG. 9 is a block diagram showing the outbound e-mail processor 712 in greater detail.

Processing section 712 receives message stream 905 from mail tracking processor 710, containing a series of e-mails separated by control characters 906. Each e-mail message includes a message header section 902 and a message body 901. A blank line 903 separates the header section 902 from the body 901.

The header section preferably includes the hostname or domain name 907 of the intended recipient and a unique job number 908 identifying the e-mail within the system. The job number 908 was previously created by the mail-tracking section 710. To speed up message delivery time, the message stream 905 may be pre-sorted by pre-sorting processor 932, such that similar or identical destination addresses are grouped together.

The message stream 905 is input to Queueup processor 910, which includes hash processor 911 and control processor 912. Control processor 912 separates each individual message from the message stream and then forwards the message to hash processor 911. Additionally, control processor 912 updates each e-mail's record in database 916 on the progress of the messages through the system and initiates queries to DNS server 931. Hash processor 911 forwards each message to one of queues 920–924 based on a hash of the message MX information, as described in more detail below.

Preferably, DNS server 931 queries the Internet DNS to obtain the IP addresses and MX information required to deliver the e-mail messages. The IP addresses and MX information is returned to the control processor 912, and is eventually used by the queues and the hash processor 911 in transmitting packets across the Internet. Preferably, for e-mail messages with known future delivery times, DNS server 931 queries the Internet DNS in advance of the delivery time, and stores the returned information in database 16. By relieving the queues of the responsibility of querying the Internet DNS, and by querying the Internet ahead of the scheduled e-mail delivery time, the DNS server 931 speeds message delivery. Alternatively, one may remove DNS server 931 and force the queues to individually query the Internet DNS for the IP addresses and MX information.

A destination site that receives a large volume of e-mail may designate multiple hosts to accept such e-mail. For example, the MX information for a large Internet provider such as aol.com may be:

aol.com preference=15, mail exchanger=b.mx.aol.com
aol.com preference=15, mail exchanger=c.mx.aol.com
aol.com preference=15, mail exchanger=d.mx.aol.com
aol.com preference=15, mail exchanger=e.mx.aol.com
aol.com preference=15, mail exchanger=f.mx.aol.com
aol.com preference=15, mail exchanger=a.mx.aol.com This indicates that e-mail sent to aol.com should be sent to one of six hosts, b.mx.aol.com through a.mx.aol.com, all with an equal preference for receiving the e-mail. Preferably, when the DNS server 931 queries the Internet DNS and obtains MX information including multiple hosts, all with an equally low delivery preference, the DNS server will randomly pick one of the hosts and transmit that chosen host to control processor 912 and database 16. This ensures that the hash processor 911 will uniformly queue the messages over the available queues, thus reducing clumping in a queue that may otherwise occur when there is one destination receiving an exceptionally high volume of e-mail.

Local Area Network (LAN) 918 preferably couples queueup processor 910 with processors 927 and 928. Similarly, LAN 917 preferably couples the queueup processor 910 with processors 925 and 926. Multiple LANs transferring information to processors 925–928 increases the total bandwidth to the processors 925–928. Accordingly, more or less LANs could be installed depending on system bandwidth requirements. Processors 925–928 transmit and receive packets over a network such as the Internet, illustrated as element 930.

Processors 925–928 and queues 920–924 may be connected to multiple networks in addition to the Internet. For example, while processors 925, 926 may be connected to the Internet, processor 927 may be connected to a second network, such as the MCI network, and processor 928 to a third network, such as the Sprint network. In this situation, control processor 912 and hash algorithm 911 may increase the speed with which selected e-mails are delivered by routing e-mails to the queues that connect to the network matching the e-mail destination. For example, the hashing routine may be adapted so that an e-mail destined to a subscriber on the MCI network will be hashed to queue 923, which resides on the processor connected to the MCI network. Likewise, for preferred or dedicated hosts, often associated with large providers, the hash processor may be adapted to place all e-mail for the preferred host in one or more queues specifically tuned for delivery to that host.

Processors 925–928 send status and error information to control processor 912, which forwards the information to the appropriate e-mail record in database 16. Preferably, database 16 is notified when the e-mail messages enter the queues 920–924 and as they are transmitted to the Internet. In this manner, the status of an e-mail message as it progresses through the system can be determined by querying the database 16.

Incoming e-mail/bounced message handler 933, described in more detail below, receives and processes incoming e-mail messages.

Figure 10:
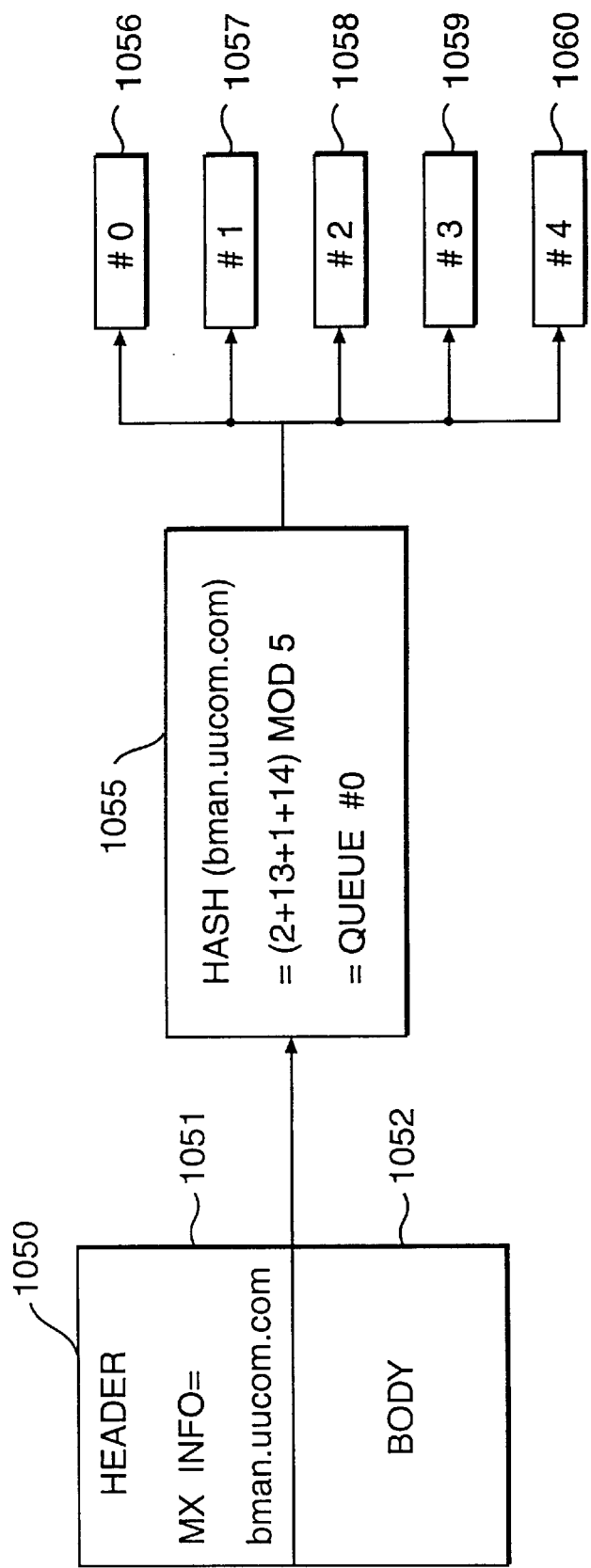
FIG. 10 is a conceptual diagram illustrating the interaction of a hash section and queues for a service processing system in accordance with another embodiment of the present invention.

FIG. 10 is a conceptual diagram illustrating the interaction of a hash section and queues for the service processing system in accordance with another embodiment of the present invention.

E-mail message 1050 contains header information 1051 and body 1052. In this example, the header information 1051 includes the MX hostname information "bman.uucom.com." Hash processor 1055 receives the message 1050 and forwards it to a selected one of queues 1056–1060 based on the hostname. Queues 1056–1060 process and transmit the message.

Hash algorithms are well known in the art, and there are many suitable hash algorithms which may be implemented in hash processor 1055. For example, a simple hash algorithm may be: (a) truncate the MX information to its first four letters (e.g., bman), (b) add the letters together according to the position of the letters in the alphabet (b=2, a=1, m=13, n=14), (c) and divide by the number of available queues, using the remainder as the queue to select (30/5=6 R 0). Although the hash section 1055 is shown here as operating on a symbolic name, alternatively, the hash operation may operate on an IP address.

Hash processor 1055 may implement an "adaptive" hash by altering the hash algorithm based on input from control processor 912. This is desirable in situations such as the one described above, in which processors 925–928 are connected to multiple networks in addition to the Internet.

The novel arrangement of multiple, parallel queues to transmit e-mail, as shown in FIGS. 9 and 10, significantly increases total e-mail output because multiple queues are simultaneously processing e-mail transmissions. Hashing the messages to the queues so that the messages are delivered evenly while keeping the same destinations in the same queues ensures that the queue load will be generally balanced. Because setting up and closing the initial e-mail connection between a transmitting and receiving host is one of the more time consuming steps in e-mail transmission, the chance of two back-to-back messages sharing the same destination is increased in the present invention because like destinations are hashed to the same queue. In this situation, transmission time will decrease because the queue does not have to close and then reinitialize the same destination.

The out-bound e-mail processing section 712, shown in FIGS. 7 and 9, may be scaled to dynamically increase its e-mail throughput. That is, based on message load, additional queues or processors may be quickly brought on-line and the hashing algorithm adjusted to accommodate for the added queues or processors.

Figure 11:
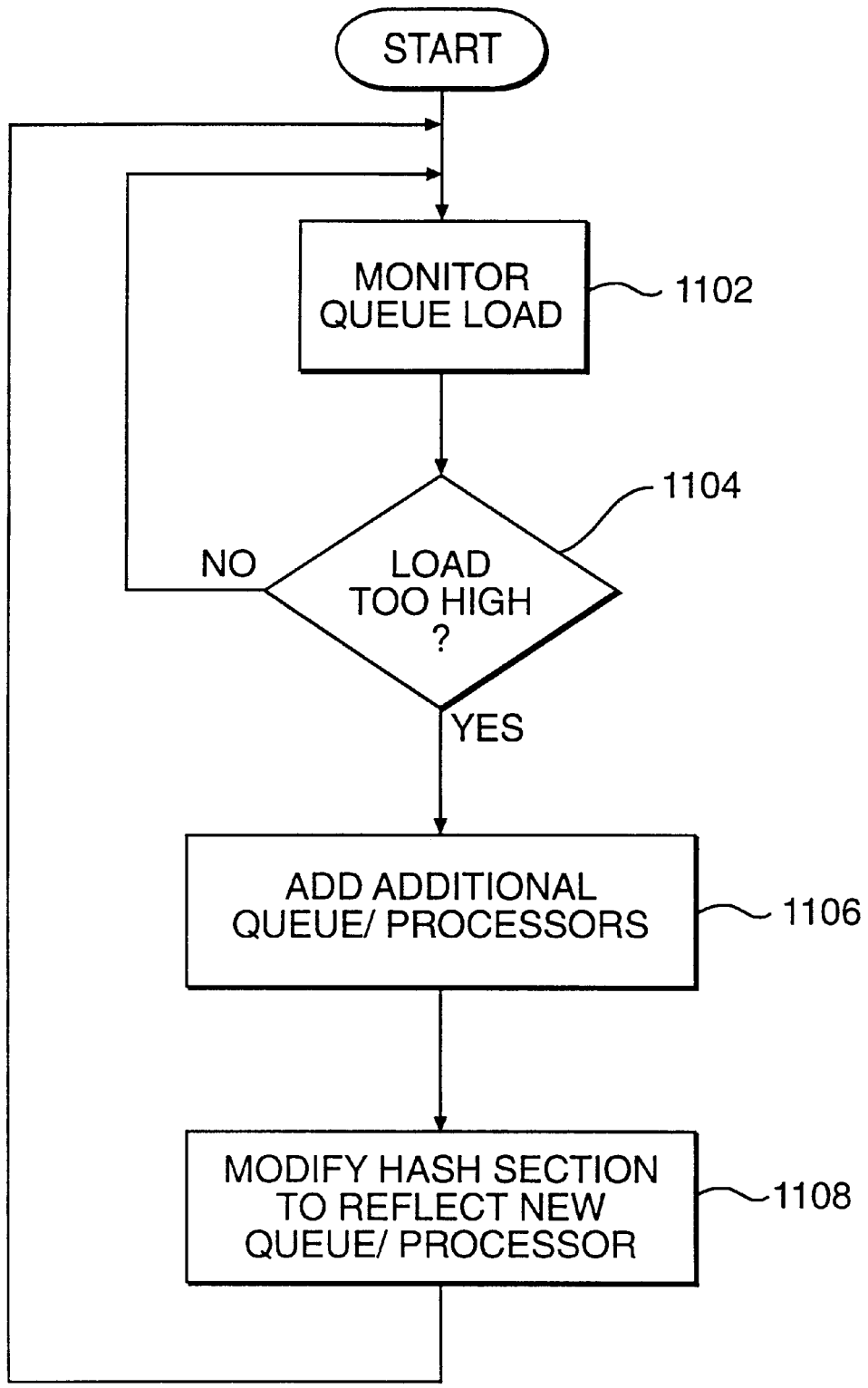
FIG. 11 is a flow chart showing a preferred method of dynamically scaling a number of queues/processors for a service processing system in accordance with another embodiment of the present invention.

FIG. 11 is a flow chart showing a preferred method of dynamically scaling a number of queues/processors. Control processor 912 monitors the message input load (step 1102), and if the load is determined to be too high (step 1104), an additional queue is added (step 1106). Next, the hash algorithm is adjusted to reflect the new queue by increasing the range of the hash algorithm (step 1108). Control processor 912 may bring additional processors on-line as needed to accommodate the additional queues.

The method of dynamically scaling to add new processors/queues, as shown in FIG. 11, may also, with little modification, be applied to reduce the number of active processors/queues. Down scaling the system may be desirable during off-peak message delivery times or when a processor malfunctions and needs to be quickly taken offline for repairs.

E-mail transmission from each of queues 920–924 to the Internet will now be described.

The transmitting portion of queues 920–924 are preferably a commercially available e-mail package such as SENDMAIL. When transmitting e-mail, SENDMAIL packages each e-mail in an envelope analogous to an envelope that a paper letter is mailed in. Before transmission, queues 920–924 insert a copy of unique job number 908 into the envelope created by SENDMAIL.

Before each e-mail can be transmitted, the queue must obtain the IP address that the e-mail is to be routed to. As discussed previously, the queue may itself query the Internet DNS for the IP address or if a valid IP address is known by the system, the queue will get the IP address from control processor 912. Next, the queue sends an initialization message to the destination host, inquiring if the host is ready to receive the e-mail message. If the host responds favorably, e-mail transmission is initiated.

Occasionally, the time elapsed between the initialization message and the acknowledgment message may become excessively long, unduly backlogging the queue. Traditionally, if too much time elapses, the queue will end the transmission of the e-mail, and either immediately retry transmitting the e-mail message or resubmit the e-mail message at the end of the queue.

Figure 12:
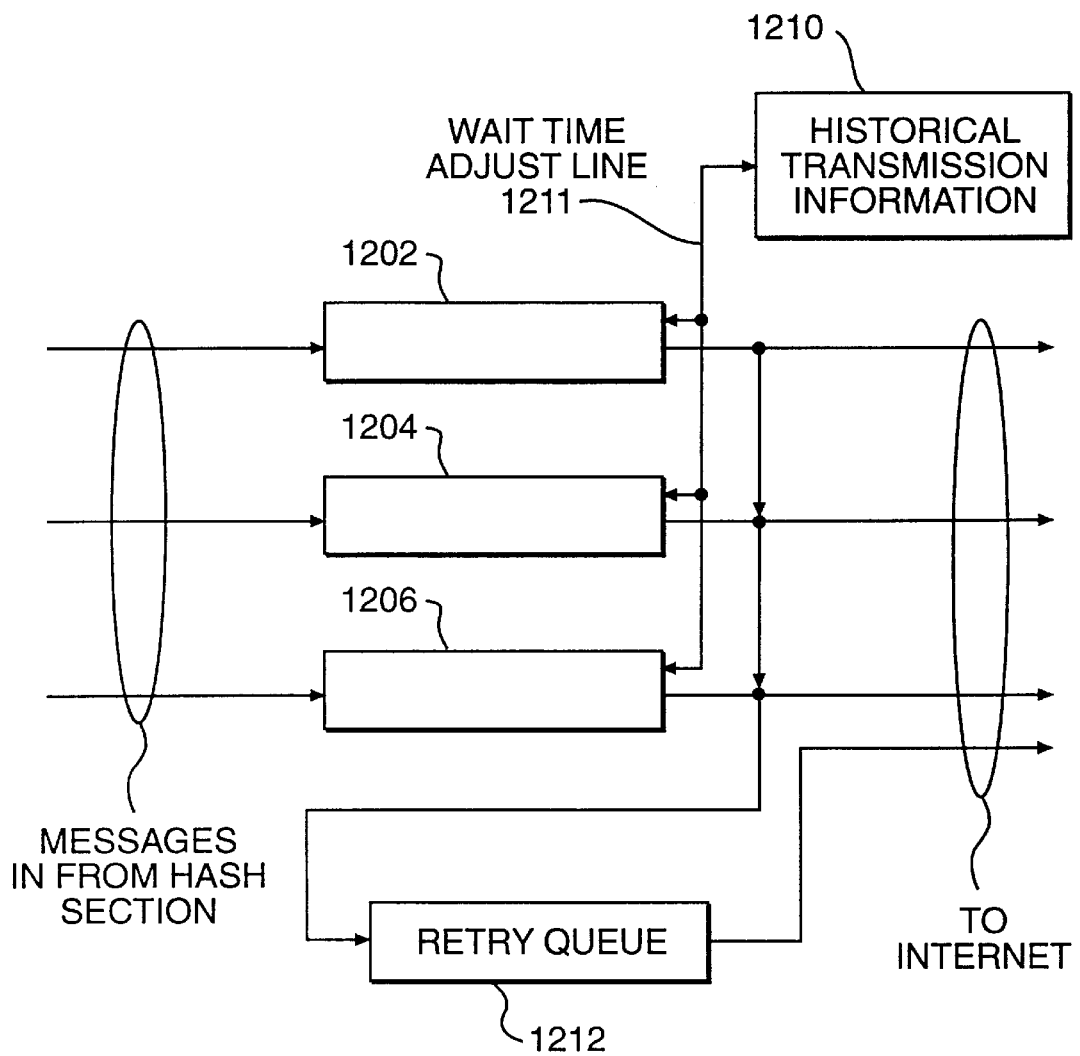
FIG. 12 is a block diagram illustrating a system for reducing time wasted while an e-mail queue waits for an acknowledge signal from a destination host in accordance with another embodiment of the present invention.

FIG. 12 is a block diagram illustrating a system for reducing time wasted while an e-mail queue waits for an acknowledge signal from a destination host in accordance with another embodiment of the present invention. Queues 1202, 1204, and 1206 receive input e-mail messages from the hash processor 911 for transmission over the Internet. Each queue has a set wait time between the queue's initialization message and the reception of the acknowledgment message, after which the queue will terminate transmission of the e-mail message and forward it to the re-try queue 1212. Re-try queue 1212 is a secondary queue for transmitting troublesome e-mails. Preferably, re-try queue 1212 is set to wait a much longer time for acknowledgment from the destination hosts then the main queues 1202, 1204, and 1206. E-mails addressed to slow-to-respond destination hosts are moved out of the main transmission queues 1202, 1204, and 1206, and into re-try queue 1212, and therefore the main queues are not unduly slowed down.

Historical transmission information processor 1210 may be optionally implemented in the embodiment shown in FIG. 12. Processor 1210 is connected to queues 1202, 1204, and 1206 by wait time adjust line 1211. Through line 1211, processor 1210 controls the wait times of queues 1202, 1204, and 1206.

In operation, processor 1210 dynamically adjusts the wait times of queues 1202, 1204, and 1206 based on historical feedback. That is, processor 1210 monitors the destinations of the e-mails and the wait times they required in previous transmissions. Based on this historical analysis, processor 1210 sets the wait times for queues 1202, 1204, and 1206. In this manner, destinations that previously required a short wait time will be set with a relatively short wait time, while destinations that previously required a longer wait time will be set with a relatively longer wait time. A wait time exceeding the set wait time indicates that there is a problem with the destination host, and the e-mail is forwarded to the re-try queue 1212. Alternatively, instead of setting a long wait time for e-mails that previous required a long wait time, processor 912 may force the e-mail to skip the main queues 1202, 1204, and 1206 altogether, immediately forwarding them to re-try queue 1212. In this manner, queues 1202, 1204, and 1206 are kept as "clean" as possible, thus facilitating efficient, high volume e-mail delivery.

E-mail received by the system generally takes one of two forms: original e-mail created by a human, or e-mail returned to the system because of a transmitting error ("bounced e-mail"). The incoming e-mail/bounced e-mail handling processor 933 automatically determines, in most situations, which of the received e-mails have been bounced and takes appropriate action, as described below.

Figure 13:
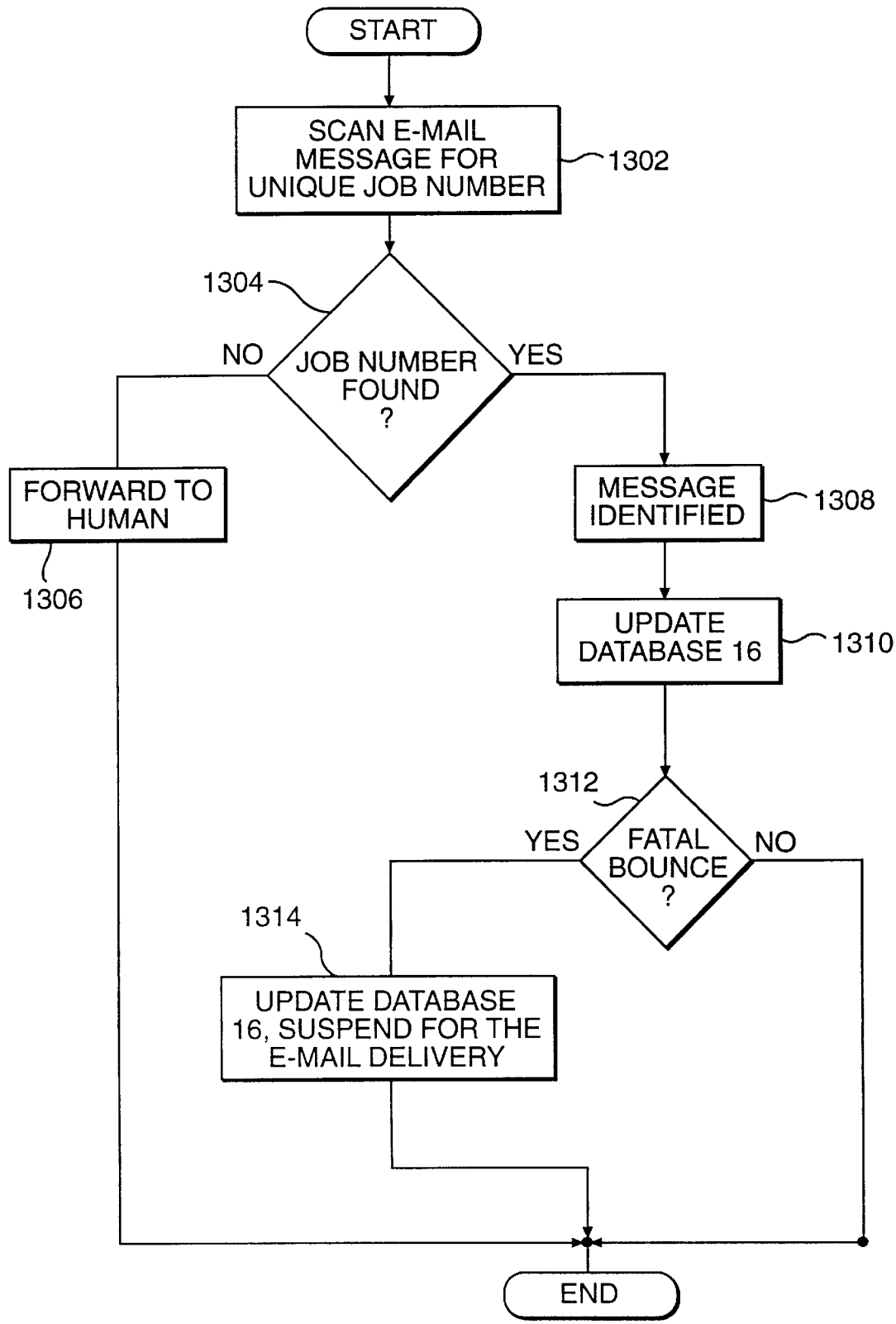
FIG. 13 is a flow diagram illustrating an automated bounced e-mail handling procedure for a service processing system in accordance with another embodiment of the present invention.

FIG. 13 is a flow diagram illustrating an automated bounced e-mail handling procedure for a service processing system in accordance with another embodiment of the present invention.

Received e-mail messages are first scanned by processor 933 for the unique job number inserted by the mail tracking processor 710 into the message header and the message envelope (step 1302). If a job number is not found, processor 933 forwards the e-mail to a human for review (steps 1304, 1306). If a job number is found within the e-mail, it is associated with the transmitted e-mail, and the database 16 is updated to indicate that the message bounced (steps 1304, 1308, and 1310). Next, at step 1312, processor 933 determines if the message is a fatal bounce. If the bounce is fatal, which indicates that the end-user will probably never be able to receive mail at the listed address, the system updates database 16 to indicate that further e-mail deliveries to that address should be suspended (step 1314). A fatal bounce is indicated by, for example, an unknown user or an undeliverable mail message in the subject line of the bounced e-mail.

In the embodiments shown in FIGS. 7–13, service processing system 104 is implemented as a network of computers with appropriate software and related hardware. In particular, timing processor 704, e-mail composition processor 706, formatter 708, e-mail tracking processor 710, pre-sorting processor 932, hash processor 911, and control processor 912 are preferably implemented as software. The software may be stored on any computer readable medium, such as a compact or magnetic disk. Specific hardware to implement the above is preferably a Unix-based system such as Sun SparcStation 5 machines with 128 k RAM, and 4 gig of hard drive space. The SparcStations are networked with a 10 Megabit Ethernet connection and communicate using TCP/IP protocols.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

We claim:

1. An electronic mail (e-mail) delivery system, comprising:
    a plurality of delivery queues for delivering e-mail to a plurality of destination hosts, the delivery queues being maintained on one or more processors;
    a stream of messages, each message in the stream including a destination address for specifying a recipient of the message and a message body;
    a routing processor for receiving the stream and routing the messages in the stream to one of the plurality of delivery queues based on the destination address.

2. The system of claim 1, wherein the routing processor includes hash means for hashing the messages based on the destination addresses.

3. The system of claim 1, further including means to dynamically adjust the number of the delivery queues based on an input message load.

4. The system of claim 1, further including means to dynamically adjust the number of delivery queues being used at any one time based on the number of processors.

5. The system of claim 1, further including means to dynamically adjust the number of routing processors based on an input message load.

6. The system of claim 5, further including a plurality of local area networks, the routing processors being located on different ones of the plurality of local area networks.

7. A system according to claim 1, wherein the destination address corresponds to a mail exchanger host of the destination recipient.

8. The system of claim 1, further comprising a domain name server for querying a distributed database on the Internet and receiving a list of mail exchanger host addresses in response to the query.

9. The system of claim 1, further including means for sorting the input stream based on the destination addresses prior to the input stream being received by the routing processor.

10. A method for controlling electronic mail ("e-mail") delivery to a plurality of the destination hosts, comprising the steps of:
    routing outgoing e-mail messages to one of a plurality of e-mail queues, the routing being controlled such that e-mail messages with common destinations are routed to the same e-mail queues;
    delivering the e-mail messages in each queue to a destination host designated by the e-mail messages.

11. A computer readable medium including instructions for operating a processor to deliver electronic mail ("e-mail") to a plurality of destinations, the instructions designed to perform the steps of:
    routing outgoing e-mail messages to one of a plurality of e-mail queues, the routing being controlled such that e-mail messages with common destinations are routed to the same e-mail queues;
    delivering the e-mail messages in each queue to a destination host designated by the e-mail messages.

12. A method for controlling electronic mail ("e-mail") transmission, comprising the steps of:
    routing outgoing e-mail messages to one of a plurality of e-mail queues, the routing being controlled such that the e-mail messages with common destinations are routed to the same e-mail queues;
    initiating a delivery protocol for each said e-mail message in each said queue;
    waiting a predetermined period for acknowledgment of a successful delivery of the e-mail message;
    removing the e-mail message from the queue when the predetermined waiting period has elapsed.

13. The method of claim 12, further including the step of notifying a database as the outgoing e-mail messages are routed to the e-mail queues.

14. The method of claim 13, further including the step of notifying the database upon successful delivery of the e-mail message.

15. The method of claim 12, wherein the waiting step includes the step of dynamically adjusting the waiting period based on e-mail message histories.

16. A method according to claim 12, wherein the routing step includes the step of hashing the e-mail destinations to determine which one of the plurality of e-mail queues the messages will be routed to.

17. A method according to claim 12, wherein the removing step further includes the step of transferring the removed e-mail messages to a queue dedicated to delivering removed e-mail messages.

18. The method of claim 16, wherein the step of hashing includes the step of dynamically adjusting a hash algorithm to alter distribution of the routed e-mail messages.

19. A method of tracking electronic mail (e-mail) messages by an e-mail delivery system, the method comprising the steps of:
  inserting a code into a first e-mail message to uniquely identify the first e-mail message;
  sending the first e-mail message with the inserted code over a network to a recipient;
  receiving a second e-mail message containing the code; and
  matching the second e-mail message with the first e-mail message based on the code.

20. The method of claim 19, wherein the inserting step includes the step of inserting the code into a message identification field and an envelope of the first e-mail message.

21. The method of claim 19, wherein the sending step includes the step of updating a database to indicate that the first e-mail message has been transmitted.

22. The method of claim 19, wherein the matching step further includes the step of updating the database to indicate that the second e-mail message has been identified with the first e-mail message.

23. The method of claim 19, wherein the network is the Internet.

24. The method of claim 19, wherein the second e-mail message is an error message indicating that the first e-mail message could not be successfully delivered.

25. The method of claim 24, further including the step of updating the database to indicate when the error message is a fatal error message.

26. A method according to claim 19 in which the inserting step inserts the code into a message identification field of the e-mail message.

27. A method of tracking electronic mail ("e-mail") messages sent and received from a central mailing site to recipients on a network, comprising the steps of:
  inserting a code into a first e-mail message;
  sending the first e-mail message with the inserted code from the central site to the recipient via the network;
  receiving, at the central site, a second e-mail message containing the code; and
  matching the second e-mail message with the first e-mail message based on the code.

28. A method according to claim 27, wherein the code of the first e-mail message uniquely identifies the first e-mail message.

29. The method of claim 27, wherein the sending step includes the step of updating a database to indicate that the first e-mail message has been transmitted.

30. The method of claim 29, wherein the matching step further includes the step of updating the database to indicate that the second e-mail message has been identified with the first e-mail message.

31. A method for forming an electronic mailing for delivery to subscribers on a network, the method comprising the steps of:
  entering a record into a database for each of the subscribers, the entering step including the substeps of:
    selecting timing information indicating when the electronic mailing is to be assembled and delivered,
    selecting content information of the electronic mailing, and
    selecting formatting information of the electronic mailing;
  assembling the electronic mailing for each subscriber based on the record corresponding to the subscriber; and
  transmitting the assembled electronic mailing to the subscriber.

32. A method according to claim 31, wherein the entering step is performed by a subscriber through a world wide web interface.

33. A method according to claim 31, wherein the entering step is performed by a subscriber through e-mail.

34. A method according to claim 31, the formatting information indicating that the electronic mailing is to be formatted as one of: Rich Text Format (RTF), Hyper-text Markup Language (HTML), and text format.

35. A method according to claim 31, the timing information indicating that the electronic mailing is to be assembled based on an event.

36. A method according to claim 31, the timing information indicating that the electronic mailing is to be periodically assembled.

37. A method according to claim 31, wherein the selecting formatting information step includes the step of selecting formatting information based on compatibility of the subscriber with the selected formatting information.

38. A method according to claim 31, wherein the assembling step includes inserting a general advertising message into the mailing.

39. A method according to claim 31, wherein the assembling step includes inserting a targeted advertising message into the mailing based on the record corresponding to the subscriber.

40. A method according to claim 31, wherein the assembling step includes inserting a targeted advertising message into the mailing based on the selected content information.

41. A method according to claim 31, wherein the assembling step deletes a general advertising message in the mailing based on an analysis of the record corresponding to the subscriber.

42. An electronic mail (e-mail) delivery system, comprising:
  a plurality of delivery queues for delivering e-mail to a plurality of destination hosts, the delivery queues being maintained on one or more processors;
  a stream of messages, each message in the stream including a destination address for specifying a recipient of the message and a message body;
  a routing processor for receiving the stream and routing the messages in the stream to one of the plurality of delivery queues based on a sort criteria.

43. The method of claim 19, further comprising the step of correlating the recipient of the first e-mail message to the second e-mail message.

44. The method of claim 25, wherein the step of updating the database includes the substep of indicating that no more e-mail messages should be delivered to the recipient.

45. The system of claim 2, wherein the routing processor dynamically adjusts the hashing when the number of messages in a particular queue is determined to be too high.

46. The system of claim 1, wherein the routing processor adjusts the routing of the messages when the number of messages in a particular queue is determined to be too high.

* * * * *